United States Patent Office 3,816,469
Patented June 11, 1974

3,816,469
INSECTICIDAL ESTERS OF CHRYSANTHEMIC ACID AND ALCOHOLS RELATED TO 3-HYDROXYMETHYLBENZOFURAN
Wayne I. Fanta, Colerain, Ohio, assignor to the Procter & Gamble Company, Cincinnati, Ohio
No Drawing. Filed Mar. 1, 1971, Ser. No. 120,043
Int. Cl. C07d 5/42
U.S. Cl. 260—346.2 R
8 Claims

ABSTRACT OF THE DISCLOSURE

Novel chrysanthemic acid (chrysanthemum carboxylic acid) esters of 3-hydroxymethylbenzofuran and the corresponding substituted benzofurans and insecticidal compositions containing same.

BACKGROUND OF THE INVENTION

This invention relates to novel chrysanthemic acid esters and to insecticidal compositions containing said esters as an essential active ingredient. Current trends in the chemical control of insects call for inherently safer materials which degrade very rapidly to non-toxic substances once their purpose is accomplished. The safety of the widely used chlorinated hydrocarbons, notably DDT, is currently under question largely because of their poor biodegradability and concomitant persistence. Accordingly, there is great demand for alternative broad spectrum insecticides which are suitable for the high volume usage entailed in agricultural applications. At the same time it is necessary for new insecticides to exhibit a low order of toxicity to warm-blooded animals. Of the several insecticide classes which demonstrate low mammalian toxicity and good biodegradability, pyrethrum, a naturally-occurring insecticide mixture, has found wide usage. In addition to its safety advantages, this natural mixture affords rapid knock-down and kill of a broad spectrum of insects; however, it is unstable to light, air, and heat, and is very expensive. The most active component of pyrethrum is pyrethrin I and a number of analogous compounds have been proposed for insecticidal use. Allethrin, a widely used synthetic pyrethrum-like insecticide, while more stable to light and heat than pyrethrum, is nevertheless expensive, a defect which is compounded by the fact that this substance is not synergized by the low cost synergizing agents such as piperonyl butoxide which are typically used in insecticidal compositions. Because of instability, high cost and limited supply, the use of pyrethrum and pyrethrin-like insecticides in garden and agricultural applications has been seriously limited or precluded.

Many of these natural insecticides are esters of chrysanthemic acid, and it has long been felt that synthetic analogues of the natural compounds could provide a better source of supply than do the natural mixtures. However, it is not possible to predict the insecticidal properties of chrysanthemic acid esters, since even minor structural variations can cause marked changes in the insecticidal activity thereof. At the same time, it is well known that certain insects, in time, become immune to the insecticidal properties of various chemical agents. It is therefore necessary to have included in the insecticidal armamentarium various novel insecticides which can be utilized once a given class of insects no longer responds to the parent insecticidal composition. For these reasons, chrysanthemic acid esters of a variety of alcohols have been synthesized and tested as insecticides. For example, chrysanthemic acid esters of various furans have been previously described. British Patent Specification 1,178,857, published Jan. 21, 1970, discloses the preparation of a variety of furan and benzofuran esters of some cyclopropanecarboxylic acids. British Patent Specification 1,168,797, published Oct. 29, 1969, discloses some crysanthemic acid esters of various substituted furans. The co-pending application of Fanta, entitled "Novel Esters of Chrysanthemic Acid," filed Jan. 12, 1970, Ser. No. 2,443, now abandoned, describes some insecticidal esters of 3-coumaranol. The concurrently filed application of Morgan, entitled "Insecticidal Esters of Chrysanthemic Acid and Alcohols Related to 3-Hydroxymethyl-4,5,6,7-Tetrahydrobenzofuran" filed Mar. 1, 1971, Ser. No. 120,042, now abandoned, relates to other insecticidal esters of chrysanthemic acid. The co-opending application of Morgan, entitled "Novel Esters of Chrysanthemic Acid and Alcohols Related to 2-Indanol," filed Mar. 16, 1970, Ser. No. 20,127, now U.S. Pat. 3,647,857, discloses a variety of chrysanthemic acid esters of cyclic alcohols.

It is an object of this invention to provide novel chrysanthemic acid esters which are biodegradable, effect rapid knock-down and kill of a broad spectrum of insects, and possess low mammalian toxicity. It is a further object of this invention to provide insecticidal compositions containing novel chrysanthemic acid esters of 3-hydroxymethylbenzofuran. These and other objects are obtained by the present invention as will become apparent from the following disclosure.

DETAILED DESCRIPTION OF THE INVENTION

The novel compounds of the present invention are chrysanthemic acid esters of 3-hydroxymethylbenzofuran and substituted analogues thereof, said esters having the general formula:

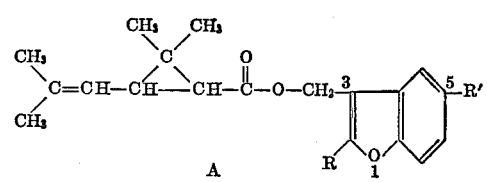

wherein R is a member selected from the group consisting of hydrogen and lower alkyl, i.e., methyl, ethyl, propyl and butyl, and R' is a member selected from the group consisting of hydrogen, lower alkyl (e.g., methyl, ethyl, propyl and butyl), lower alkoxy (e.g., methoxyl, ethoxyl, propoxyl), phenyl and halogen (e.g., chlorine, bromine, iodine). A synthetic scheme for the preparation of compounds having the general formula A, above, wherein R and R' are hydrogen, is outlined below.

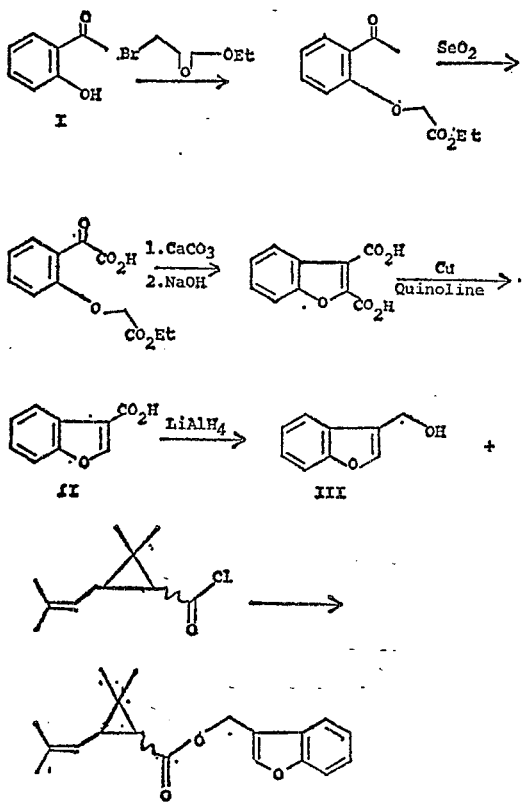

According to the above outline, the esters of this invention encompassed by structure A are prepared by a stepwise process comprising: (1) preparing the benzofuran-3-carboxylic acid (II) according to the procedure described by G. Hallman and K. Hägele, *Ann., 662*, 147 (1963); (2) reducing the acid (II) to 3-hydroxymethylbenzofuran (II) with lithium aluminum hydride; and (3) esterifying the alcohol (III) with chrysanthemoyl chloride, which in turn, is prepared by the method of Matsui and Meguro, *Agr. Biol. Chem., 28*, 27 (1964).

Alternatively, the esterification step of the present invention can be effected in other ways. The 3-hydroxymethylbenzofuran (or substituted benzofuran) can be heated with chrysanthemic acid in the presence of a strong acid, in an organic solvent capable of azeotropically boiling with water, thereby removing the water formed in the esterification. The benzofuran alcohol can also be heated with a lower alkyl ester of chrysanthemic acid in the presence of a basic catalyst such as sodium hydroxide, potassium hydroxide, sodium alcoholate, or potassium alcoholate, and the like, while continuously removing the lower alcohol formed through trans-esterification of the reaction system. In such cases, the methyl, ethyl, n-propyl and iso-propyl esters of chrysanthemic acid are suitable. In the most preferable esterification, the 3-hydroxymethylbenzofuran, or derivative thereof, is allowed to react with the chrysanthemic acid halide, preferably at temperatures from about 20° C. to about 100° C. in an inert organic solvent, preferably in the presence of an agent such as pyridine, triethylamine or other suitable amine, such that the esterification proceeds with the isolation of a hydrohalic acid salt within a short period of time. For this purpose, the chrysanthemic acid chloride is the most preferred, although the acid bromide and the acid iodide can be employed.

Derivatives of 3-hydroxymethylbenzofuran having substituents R, as hereinbefore defined, on the furan ring, and substituents R', as hereinbefore defined, on the benzene ring system can be prepared in a variety of ways. For example, the Hallman and Hägele reference, above, discloses the preparation of a variety of benzofuran acid compounds having alkyl and alkoxy groups as R and R'. These acids can be reduced to the corresponding alcohols using lithium aluminum hydride and esterified with chrysanthemoyl chloride to provide insecticidal esters of the type herein disclosed. Other such chrysanthemic esters of substituted benzofurans can be prepared in the manner detailed in the examples hereinafter to provide insecticidal analogues of the parent compound A.

The compounds of this invention can exist in several isomeric and optically isomeric forms, e.g., *cis*-configuration, *trans*-configuration, dextro- and levorotatory forms of each, etc., and mixtures and racemates thereof. It is intended that the claims herein be construed to encompass all such forms and mixtures thereof. A preferred insecticidal ester herein is (±)-*cis,trans*-3-hydroxymethylbenzofuran chrysanthemate.

The preparation of the esters of the present invention is described in more detail in the following examples. The examples are not intended to be limiting, but only to demonstrate the preparation of a variety of the compounds of this invention.

EXAMPLE I

Preparation of (±)-*cis,trans*-chrysanthemic acid ester of 3 - hydroxymethylbenzofuran (Compound A; R=H, R'=H)

Step 1.—3-hydroxymethylbenzofuran: To a slurry of lithium aluminum hydride (0.2 g., $6.0 \times 10^{-3}$ M), in ether (20 ml.) was added benzofuran-3-carboxylic acid (0.3 g., $1.9 \times 10^{-3}$ M) in diethyl ether (10 ml.) over a period of 20 minutes, prepared by heating benzofuran - 2,3 - dicarboxylic acid, copper and quinoline at 200° C., as noted in the reaction sequence described above. (The dicarboxylic acid, itself, is prepared by the base-catalyzed reaction of ethylbromoacetate and 2-hydroxyacetophenone according to the procedure of Hollman and Hägele, *Ann., 662*, 147, 1963.) The reaction mixture was refluxed for 16 hours after which it was decomposed by the addition of water (ca. 1 ml.) and 15% sodium hydroxide (0.1 ml.). Filtration, solvent removal, and sublimation (pot temperature ca. 100° C./0.25 mm.) gave 0.3 g. of white solid, M.P. 44–46° C.; IR (CHCl$_3$) 3600 (free OH), 3450 (H bonded OH), and 870 cm.$^{-1}$ (furan); NMR (CDCl$_3$) $\tau$ 7.4 (s, 1, OH), 5.4 (s, 2, C$\underline{H}_2$OH), and 2.3–3.0 (complex area, 5, aromatic protons).

Step 2.—(±)-*cis,trans*-chrysanthemate of 3 - hydroxymethylbenzofuran: A mixture of chrysanthemoyl chloride (0.4 g., $2.2 \times 10^{-3}$ M), prepared according to the procedure of Matsui and Meguro, above, pyridine (0.2 g., $2.3 \times 10^{-3}$ M), 3-hydroxymethylbenzofuran (0.3 g., $2.0 \times 10^{-3}$ M) prepared in Step 1, above, benzene (10 ml.) was stirred at room temperature for 20 hours. The reaction mixture was diluted with ether (25 ml.) and then washed with 1 N hydrochloric acid (10 ml.), 1 N sodium hyroxide (10 ml.), and water (10 ml.). The organic phase was dried (magnesium sulfate) and was evaporated to yield 11.4 g. of colorless liquid which was chromatographed on Florisil (20 ml.) with hexane. A total of 0.5 g. of liquid was obtained: homogeneous on G.L.P.C. (5' 20% SE–30 at 200° C); IR (film) 1730 cm.$^{-1}$ (ester C=O). A sample of the ester was collected by preparative G.L.P.C. for spectral analysis: NMR (CDCl$_3$) $\tau$ 8.6 and 8.7 (two singlets, ca. 6, cyclopropyl methyls), 8.4 (singlet with some splitting, ca. 6, olefinic methyls), 4.8 (2 singlets, 2, OCH$_2$), 4.7 and 5.2 (2 broad areas, 1, >=<$_H$), and 2.3–2.9 (complex area, 5, aromatic protons). This analysis corresponds to the ester (±)-*cis,trans*-3-hydroxymethylbensofuran chrysanthemate.

In the above procedure, the 2-hydroxyacetophenone used to prepare the parent dicarboxylic acid is replaced by an equivalent amount of 2-hydroxy-5-methylacetophenone,
2-hydroxy-5-butylacetophenone,
2-hydroxy-5-chloroacetophenone,
2-hydroxy-5-bromoacetophenone,
2-hydroxy-5-methoxyacetophenone and
2-hydroxy-5-phenylacetophenone and, following the stepwise procedure noted above, the alcohols 3 - hydroxymethyl - 5 - methylbenzofuran, 3-hydroxymethyl-5-butylbenzofuran, 3-hydroxymethyl-5-chlorobenzofuran, 3-hydroxymethyl-5-bromobenzofuran, 3-hydroxymethyl-5-methoxybenzofuran and 3-hydroxymethyl-5-phenylbenzofuran are secured, respectively. Esterification of said alcohols with chrysanthemoyl chloride in the manner hereinbefore described yields the respective insecticidal esters, e.g., (±)-*cis,trans*-3-hydroxymethyl - 5- methoxybenzofuran chrysanthemate, ±-*cis,trans* - 3-hydroxymethyl-5-phenylbenzofuran chrysanthemate, ±-*cis,trans*-5-methylbenzofuran chrysanthemate, and the like.

EXAMPLE II

Preparation of (±)-*cis,trans*-chrysanthemic acid ester of 2-methyl-3 - hydroxymethylbenzofuran(Compound A; R=methyl, R'=H)

2-methyl - 3 - hydroxymethyl-4,5,6,7-tetrahydrobenzofuran is prepared from 2-chlorocyclohexanone and ethylacetoacetate followed by cyclization and reduction in the manner more fully described in the concurrently filed application of Morgan entitled "Insecticidal Esters of Chrysanthemic Acid and Alcohols Related to 3-Hydroxymethyl-4,5,6,7-tetrahydrobenzofuran" filed Mar. 1, 1971, Ser. No. 120,042 now abandoned. The resulting saturated benzofuran derivative is dehydrogenated by heating in toluene solution with a palladium-on-carbon catalyst at about 200° C. to yield 2-methyl-3-hydroxymethylbenzofuran. Refluxing this latter material with chrysanthemoyl chloride (1:1 mole basis) in the presence of an equivalent of pyridine yields the insecticidal ester ±-*cis,trans* - 2-methyl-3-hydroxymethylbenzofuran chrysanthemate.

Following the procedure more fully described in Morgan, above, the alcohols 2-ethyl-3-hydroxymethyl-4,5,6,7-tetrahydrobenzofuran and 2 - methyl - 3 - hydroxymethyl-5 - methyl-4,5,6,7-tetrahydrobenzofuran are prepared, respectively. The dehydrogenation of these alcohols using a palladium-on-carbon catalyst at 200° C. yields 2-ethyl-3-hydroxymethylbenzofuran and 2 - methyl-3-hydroxymethyl - 5 - methylbenzofuran. Esterification of these latter alcohols by refluxing with chrysanthemic acid yields the insecticidal esters (±)-*cis,trans*-2 - ethyl-3-hydroxymethylbenzofuran chrysanthemate and (±)-*cis,trans*-2-methyl-3-hydroxymethyl - 5 - methylbenzofuran chrysanthemate, respectively.

According to the procedure of W. Schoetensack et al., U.S. Pat. 3,235,566, incorporated herein by reference, is prepared ethyl-2-methyl-5-hydroxybenzofuran-3-carboxylate. Etherification of the hydroxyl group with an alkyl halide (e.g., methyl bromide, ethyl iodide, propyl bromide and the like) in the presence of base yields the 5-alkoxyl derivatives of the aforementioned esters. Reduction of the ester group with lithium aluminum hydride in the manner hereinbefore detailed yields the compounds 2-methyl-3-hydroxymethyl - 5 - methoxybenzofuran, 2-butyl-3-hydroxymethyl - 5 - methoxybenzofuran and 2-butyl - 3 - hydroxymethyl-5-butoxybenzofuran. Esterification of these alcohols with chrysanthemoyl chloride in the hereinbefore described manner yields insecticidal mixtures of the respective insecticidal esters.

Insecticidal testing: In the following tests the insecticidal properties of a chrysanthemate ester of 3-hydroxymethylbenzofuran (Compound A; R=H, R'=H) with a compound which is its positionally isomeric ester i.e., 2-hydroxymethylbenzofuran chrysanthemate (Compound B in the table) and with 2-hydroxymethyl-2,3-dihydrobenzofuran chrysanthemate (Compound C in the table). The former compound was prepared by the lithium aluminum hydride reduction of benzofuran-2-carboxylic acid followed by esterification with chrysanthemoyl chloride. The latter compound was prepared by esterifying 2-hydroxymethylcoumarane, prepared in the manner of Tinsley, *J. Org. Chem.*, 24, 1197 (1954) with chrysanthemoyl chloride.

ACTIVITY TOWARD HOUSEFLIES

The compound (±)-*cis,trans* - 3-hydroxymethylbenzofuran chrysanthemate (Compound A; R=H, R'=H) prepared in Example I, was dissolved in kerosene and sprayed onto houseflies according to a modification of the procedure described by C. W. Kearns and R. B. March, *Soap*, 19, 2, 101 (1943). Compounds B and C in Table I, i.e., (±)-*cis-trans* - 2 - hydroxymethylbenzofuran chrysanthemate and (±) - *cis,trans* - 2 - hydroxymethylcoumarane chrysanthemate, were applied to houseflies in the same fashion. The data, which represent duplicate tests using 50 flies per test, are set forth in Table 1.

TABLE I.—HOUSEFLY KNOCK-DOWN AND KILL

|   | Conc., w./n. | Percent knock-down | | Percent mortality, 24 hours |
|---|---|---|---|---|
|   |   | 10 min. | 120 min. |   |
| A | 0.1% | 10 | 92 | 90 |
|   | 0.01% plus 0.1% PB [1] | 4 | 4 | 7 |
| B | 0.1% | 3 | 61 | 51 |
|   | 0.01% plus 0.1% PB | 6 | 8 | 10 |
| C | 0.1% | 4 | 2 | 11 |
|   | 0.01% plus 0.1% PB | 6 | 9 | 10 |

[1] Piperonyl butoxide, a common synergist used with insecticides.

As can be seen from the foregoing, the parent compound of the class of compounds encompassed by this invention possesses good insecticidal properties. Moreover, the substantially improved insecticidal activity of the compounds of this invention over the isomeric and isomeric-saturated analogues thereof is demonstrated by the data. Additionally, the compounds of the instant invention are substantially less toxic to mammals than are most common insecticides.

The compounds of the instant invention are similarly effective when tested against the adult mosqutio, adult stable flies, black carpet beetle larva, webbing clothes moth larva, adult rice weevils, and adult sawtooth grain beetles.

Insecticidal compositions containing the esters of the present invention can be formulated and utilized as oil solutions, emulsifiable concentrates, wettable powders, dusts, aerosols, or impregnated into wood, fabrics, etc., and provide a long lasting residual effect. Such compositions can include the generally employed insecticidal carriers or diluents and auxiliary agents which are well-known to those skilled in the art. For example, suitable dusts can be prepared by admixing an insecticidal amount of the compounds of the invention with dry free-flowing powders such as clay, bentonite, fuller's earth, diatomaceous earth, pyrophyllite, attapulgite, calcium carbonate, chalk or the like. The active compounds of the invention normally comprise up to about 100%, by weight, of such dust formulations. An amount of about 0.01% to 10%, by weight, is preferred and is suitable for most applications. Likewise, suspensions or dispersions of the insecticidal compounds in a non-solvent, such as water, can be suitably employed for the treatment of foliage. Also suitably employed are solutions of the insecticides of this invention in oil which is emulsified in water. Examples of oil solvents include hydrocarbons such as benzene and toluene, halogenated hydrocarbons such as chlorobenzene, chloroform, fluorotrichloromethane and dichlorodifluoromethane, and commercial mixtures of hydrocarbons such as the common Stoddard solvents, petroleum ethers, and the like.

Aerosols can be prepared by dissolving an insecticidal amounts of the compounds of this invention in a highly volatile liquid carrier such as trifluorochloromethane, nitromethane, dichlorodifluoroethane and the like, or by dissolving such compounds in a less volatile solvent, such as benzene or kerosene, and admixing the resulting solution with a highly volatile liquid aerosol carrier such as the polyfluorohydrocarbons commonly used as aerosol propellants.

In the above-noted suspensions and aerosol compositions, about 0.005% to about 50%, by weight, more preferably about 0.005% to about 10%, by weight, of the chrysanthemate esters of this invention are suitable for use. The novel compounds of the invention are useful for controlling a variety of insects. Accordingly, a method aspect of the present invention comprises combating insects by applying to insects or to an insect habitat one or more of novel compounds of the invention.

In some instances the esters of this invention are employed in combination with a synergistic agent, for example, piperonyl butoxide, the n-octylsulfoxide of isosafrole, β - butoxy-β'-thiocyanodiethyl ether and the like. These agents as well as the hereinbefore recited carriers and diluents and mixtures thereof are encompassed by the expression "insecticidal carrier." Some exemplary insecticidal compositions containing the compounds of this invention are as follows.

Insecticidal Composition I

An insecticidal composition suitable for general use in the home and garden is prepared as follows:

Percent (wt.): Ingredient 1.0 .............. (±)-*cis,trans*-3-hydroxymethyl-benzofuran chrysanthemate.
2.0 .............. Triton X–100 emulsifier.
Balance .......... Water.

Application of the above suspension to flies, oat bugs and German cockroaches as a spray or by brush application effectively controls these insects. In the above composition, the (±)-*cis-trans*-3-hydroxymethylbenzofuran chrysanthemate is replaced by an equivalent amount of (±) - *cis,trans*-2-ethyl-3-hydroxymethylbenzofuran chrysanthemate, (±) - *cis,trans*-2-methyl-3-hydroxymethyl-5-chlorobenzofuran chrysanthemate and (±) - *cis,trans*-3-hydroxymethyl-5-propoxybenzofuran chrysanthemate and equivalent results are secured in that these insect pests are killed.

Insecticidal Composition II

Percent (wt.): Ingredient
10 .............. (±)-*cis,trans*-3-hydroxymethyl-benzofuran chrysanthemate.
0.5 ............. Sulfur.
Balance ......... Chalk.

The insecticidal dust described above is suitable for use on all manner of shrubs and plants and is preferably applied out-of-doors.

In the above composition, the concentration of (±)-*cis,trans* - 3-hydroxymethylbenzofuran chrysanthemate is increased to about 20%, by weight, of the total composition. The resulting insecticidal dust provides superior knock-down and kill of stinging insects such as wasps, bees and the like and is suitable for clearing areas of infestation by such insects.

Insecticidal Composition III

Percent (wt.): Ingredient
0.005 ........... (±)-*cis,trans*-3-hydroxymethyl-benzofuran chrysanthemate.
5% .............. Polyethylene glycol (mol. wt. range 600–10,000).
Balance ......... Propellant gas.*

*50 : 50 mixture of trifluorochloromethane and dichlorodifluoroethane, containing aboue 10 p.p.m. nitromethane.

The above composition is suitable for application to domestic animals for control of gnats, flies, fleas and the like.

In the above aerosol insecticidal composition the concentration of benzofuran chrysanthemate is increased to about 1.5% and the resulting composition is suitable for use with domestic farm animals such as cows, sheep and the like to control black flies, horse flies, blow flies, and other insect pests.

In the above compositions the (±)-*cis,trans*-3-hydroxymethylbenzofuran chrysanthemate is replaced by an equivalent amount of (±)-*cis,trans*-3-hydroxymethyl-5-methylbenzofuran chrysanthemate, (±)-*cis,trans*-2-methyl-3-hydroxymethyl-5-methylbenzofuran chrysanthemate, (±)-*cis,trans*-3-hydroxymethyl-5-phenylbenzofuran chrysanthemate, (±)-*cis,trans*-3-hydroxy-methyl - 5 - methoxybenzofuran chrysanthemate, and (±)-*cis,trans*-2-methyl-3-hydroxymethylbenzofuran chrysanthemate, respectively, and equivalent insecticidal compositions are secured.

What is claimed is:

1. A compound of the formula $$\begin{array}{c} CH_3 \\ CH_3 \end{array}\!\!>\!\!C\!=\!CH\!-\!CH\!\!<\!\!\begin{array}{c} CH_3\;\;CH_3 \\ \diagdown\!C\!\diagup \\ \diagup\;\;\diagdown \end{array}\!\!CH\!-\!\overset{O}{\overset{\|}{C}}\!-\!O\!-\!CH_2\!-\!\!\begin{array}{c} 3 \\ \\ R\!-\!\!\diagdown\!\!O\!\diagup \\ 1 \end{array}\!\!\!-\!\!5\text{-}R'$$

wherein R is a member selected from the group consisting of hydrogen, methyl, ethyl, propyl, and butyl and wherein R' is a member selected from the group consisting of hydrogen, methyl, ethyl, propyl, butyl, methoxyl, ethoxyl, propoxyl, phenyl, chlorine, bromine and iodine.

2. A compound in accordance with claim 1 which is (±)-*cis,trans* - 3 - hydroxymethylbenzofuran chrysanthemate.

3. A compound in accordance with claim 1 which is (±)-*cis,trans* - 2 - methyl - 3 - hydroxymethylbenzofuran chrysanthemate.

4. A compound in accordance with claim 1 which is (±)-*cis,trans*-3-hydroxymethyl - 5 - methoxybenzofuran chrysanthemate.

5. A compound in accordance with claim 1 which is (±)-*cis,trans* - 3 - hydroxymethyl - 5 - phenylbenzofuran chrysanthemate.

6. A compound in accordance with claim 1 which is (±)-*cis,trans* - 3 - hydroxymethyl - 5 - methylbenzofuran chrysanthemate.

7. A compound in accordance with claim 1 which is (±)-*cis,trans*-2-ethyl-3 - hydroxymethylbenzofuran chrysanthemate.

8. A compound in accordance with claim 1 which is (±)-*cis,trans* - 2 - methyl - 3 - hydroxymethyl-5-methylbenzofuran chrysanthemate.

References Cited

UNITED STATES PATENTS 3,567,740   3/1971   Matsui ............ 260—347.4
3,465,007   9/1969   Elliot ............. 260—347.4

JOHN D. RANDOLPH, Primary Examiner

B. DENTZ, Assistant Examiner

U.S. Cl. X.R.

424—285; 260—544